US006439168B1

(12) United States Patent
Maglich et al.

(10) Patent No.: US 6,439,168 B1
(45) Date of Patent: Aug. 27, 2002

(54) DUAL PET LEASH

(76) Inventors: Robert L. Maglich, 1134 Huron La.; Vivian Ruth Maglich, 3177 La Mancha Way, both of Henderson, NV (US) 89015

(*) Notice: Subject to any disclaimer, the term of this patent is extended or adjusted under 35 U.S.C. 154(b) by 0 days.

(21) Appl. No.: 09/907,819

(22) Filed: Jul. 19, 2001

(51) Int. Cl.[7] ............................................. A01K 27/00
(52) U.S. Cl. ...................................... 119/795; 119/792
(58) Field of Search ................................. 119/769, 792, 119/795, 797, 798

(56) References Cited

U.S. PATENT DOCUMENTS

| 2,909,154 A | 10/1959 | Thomas |
| 2,970,729 A | 2/1961 | Allen |
| 3,120,403 A | 2/1964 | Molzan et al. |
| 3,311,088 A | 3/1967 | Peterlin |
| D244,869 S | 6/1977 | Manley et al. |
| 4,879,972 A | 11/1989 | Crowe et al. |
| 4,892,063 A | 1/1990 | Garrigan |
| 5,161,486 A | 11/1992 | Brown |
| 5,551,379 A | 9/1996 | Hart |
| D375,587 S | 11/1996 | Maglich |
| 5,632,234 A | 5/1997 | Parker |
| 5,701,848 A | 12/1997 | Tozawa |
| 5,709,172 A | 1/1998 | Maglich |
| 5,852,988 A | 12/1998 | Gish |
| D417,317 S | 11/1999 | Greer |
| 6,029,611 A | 2/2000 | Hershauer |
| 6,047,665 A | 4/2000 | Deveaux |

Primary Examiner—Peter M. Poon
Assistant Examiner—Son T. Nguyen
(74) Attorney, Agent, or Firm—Richard C. Litman

(57) ABSTRACT

An elongate pet restraint line has a pet collar or harness attachment extending from each end thereof. A freely floating leash attachment ring is captured on the pet restraint line, with ring movement limited only by the collar attachments at each end of the line. A leash line includes a handle loop and a pet restraint attachment for removably securing the leash line to the leash attachment ring of the pet restraint line. One leash embodiment comprises a long line with, a freely floating leash line securing ring installed thereon, similarly to the leash attachment ring of the pet restraint line. A leash line securing attachment is provided adjacent the handle loop, allowing the leash line to be wrapped about a stationary object and the leash line securing attachment removably secured to the leash line securing ring, to secure the assembly temporarily to a stationary object.

5 Claims, 3 Drawing Sheets

DUAL PET LEASH

BACKGROUND OF THE INVENTION

1. Field of the Invention

The present invention relates generally to animal restraints and the like, and more specifically to a leash for controlling two pets simultaneously. The present dual pet leash is particularly adaptable for use with dogs, although it may be used with other animal species as well, for walking or otherwise restraining the pets as desired.

2. Description of the Related Art

Pets have become increasingly popular as companions for many people. However, just as people enjoy the companionship of pets, most animals also enjoy companionship as well. With the busy work and other activities of most people, many pet owners have opted to have two or more pets, so the pets may keep one another company while the owner is at work or otherwise away from the household.

All pets require a certain amount of time and care on the part of the owner, with the time and care depending upon the species and size of the animal. Most larger animals are not suited for continuous confinement, and must receive at least some exercise on a regular basis in order to maintain their physical health and also to stimulate their minds so they remain alert. However, in most suburban areas, pets are not allowed to run freely.

Accordingly, pets in such environments must be restricted to a leash or other restraint, for walking or exercising. The owner of multiple pets is faced with the problem of controlling his or her pets simultaneously in such circumstances. While the owner may purchase a leash for each pet, this is somewhat redundant, as certain components (hand straps, etc.) are duplicated needlessly. In addition, two pets will often attempt to act independently of one another, particularly when immersed in the outdoor environment with its sights, scents, and sounds which prove attractive to many domesticated animals. The owner of two pets who attempts to walk his or her pets using two leashes, is often subjected to tugs and pulls in different directions as he or she attempts to control the pets simultaneously.

Accordingly, a need will be seen for a dual pet leash, which allows the pet owner or person controlling the pets to restrain both pets simultaneously with a single leash line. The present dual pet leash includes a pet restraint line which passes through a ring at the end of the leash line opposite the handle strap thereof, with each end of the pet restraint line being attached to the collar or other restraint on the pet. The two animals are free to work back and forth against one another, with the pet restraint line running through the ring at the end of the leash. The two pets thus work against one another, rather than applying all of their energy against the controlling person. The present pet restraint also includes means for temporarily securing the leash to a stationary object (tree, pole, etc.) as desired.

A discussion of the related art known to the present inventor, and its differences from the present invention, is provided below.

U.S. Pat. No. 2,909,154 issued on Oct. 20, 1959 to Lewis E. Thomas, titled "Tethering Strap Arrangement For Animals," describes a device for tethering or anchoring a single pet to the seat of an automobile or the like. The Thomas assembly includes al closed strap which fits about the seatback, with a leash attachment affixed to a point along the closed strap. A second strap is removably attachable to the leash attachment point. The second strap or leash cannot move along the length of the closed strap; the pet is essentially limited to the length of the second strap or leash, and the fixed attachment point. In any event, no secondary attachment for a second pet or leash loop, is provided by Thomas.

U.S. Pat. No. 2,970,729 issued on Feb. 7, 1961 to Jefferson H. Allen, titled "Carriers," describes a device for carrying a series of articles (e.g., bottles). A series of lines are provided with eyelets at each of the ends thereof. The article attachment ends each have the line looped through the corresponding eyelet, with the neck of the article secured within the loop. The opposite eyelets are secured along a permanently closed loop of material, serving as a handle for the assembly. The Allen device is well suited for carrying an inanimate assembly of like objects, as the separate eyelet lines do not allow the articles to shift along the carrying loop. This teaches away from the present invention, in which it is desired to allow the single pet attachment line to run freely through the distal end of the leash.

U.S. Pat. No. 3,120,403 issued on Feb. 4, 1964 to Albert R. Molzan et al., titled "Cargo Sling," describes a series of conventional adjustable length cargo tiedown straps, each of which has one end secured to a single central circular loop of multiple plies of webbing material. The configuration is thus more closely related to the article carrier of the Allen '729 U.S. Patent discussed above, than to the present invention, with its single pet retaining strap which passes loosely through a ring at the end of a single leash line. The present invention allows the pets to move back and forth at will, varying the amount of the retaining strap to each side of the leash ring inversely as each pet works farther out or closer in to the end of the leash. The conventional cargo straps of the Molzan et al. device are each adjustable, but once adjusted, their lengths are fixed and cannot shift due to random tensile forces on their ends, as provided by the present dual pet leash invention.

U.S. Pat. No. 3,311,088 issued on Mar. 28, 1967 to Henry Peterlin, titled "Training And Walking Leash," describes a single line formed of light chain with a snap hook at one end, a central ring, and a distal ring or handle loop. The snap hook is secured to the animal's collar, with the chain being passed around the animal's chest. The distal end of the line is passed through the central ring to provide a more positive retention than provided only by the collar. The Peterlin device comprises only a single length of light chain, and cannot be used to secure two animals to a single leash, as provided by the present dual pet leash invention.

U.S. Pat. No. 4,879,972 issued on Nov. 14, 1989 to Dennis E. Crowe et al., titled "Double Pet Walker," describes a leash arrangement having a single leash for holding by the pet caretaker, with a swivel snap fastener at the distal end thereof. Two additional pet restraint lines have loops at each of their ends, with one of the loops securing to the swivel snap fastener and each opposite end securing to the collar of the pet. This arrangement of two separate lines attaching to a single attachment point at the end of the leash line, cannot allow the pet restraint lines to vary their length relative to one another, as provided by the present dual pet leash invention. Also, while Crowe et al. show their leash secured about a stationary object, they must reconfigure their leash for such use so that it can no longer restrain two animals.

U.S. Pat. No. 4,892,063 issued on Jan. 9, 1990 to Catherine M. Garrigan, titled "Leash For Two Or More Animals," describes one or more pet restraint lines which are linked together and pass through a sleeve, which is slidably positioned along the restraint line(s) and serves as a handgrip for the animal handler. While this permits the pets to work back and forth, with the free ends of the leash varying inversely to one another as the pets move, no leash line is provided. The handler must retain a constant grip upon the sleeve at all times, and cannot relax his or her grip. The present dual pet leash, with its separate leash line connecting to the pet restraint line, provides a loop through which the handler may pass a hand in order to free the grip as desired.

U.S. Pat. No. 5,161,486 issued on Nov. 10, 1992 to Steve M. Brown, titled "Hands-Free Dog Jogger Apparatus," describes a single pet restraint line which connects to an intermediate double line which in turn attaches to a waist belt worn by the animal handler. While the Brown device allows the handler to have his or her hands free, it restricts the handler by requiring that the handler have the device secured about his or her waist at all times. Most importantly, Brown makes no suggestion regarding any means of retaining two or more animals, using his leash apparatus.

U.S. Pat. No. 5,551,379 issued on Sep. 3, 1996 to Marcie J. Hart, titled "Multiple Use Motion Restraint Device," describes a series of interconnected straps. The basic assembly comprises opposite first and second straps joined by metal rings to a cable extending therebetween. A third and a fourth strap extend respectively from each ring, with yet another strap extending from another ring which is free to slide along the central cable portion of the assembly. None of the components are removable from one another, whereas the present pet restraint harness allows the central leash portion to be removed from the pet restraint line, to provide for different leash lengths and other purposes. No hand loop is provided by Hart for her assembly; a separate loop would have to be removably attached to one of the distal clips on one of the straps of her assembly. Moreover, the central sliding ring is limited in its travel by the relatively short cable length, whereas essentially the entire length of the restraint line is free to run through the leash ring of the present device.

U.S. Pat. No. 5,632,234 issued on May 27, 1997 to Gerald C. Parker, titled "Two-Pet Leash," describes a leash assembly with a relatively small hand loop having a snap hook extending therefrom. The snap hook secures to a pulley, through which a pet restraint line runs. The pet restraint line includes a snap hook at each end thereof, for securing to the collar of a pet. However, Parker also includes an additional snap hook at about the one quarter length of his pet restraint line, with a connector ring at about the same point on the opposite portion of the line. The snap hook and connector ring on the pet restraint line may be secured together to limit travel of the pet restraint line. These two components are immovably affixed to the line, and cannot pass through the small pulley sheave. Thus, the travel of the pet restraint line of the Parker assembly is limited to only about one half the line length, whereas the present dual pet leash permits the entire length of its pet restraint line to run through the retainer ring extending from the hand held leash portion. While it is noted that Parker provides a second embodiment including additional pet restraint lines extending from attachment points on a shorter line which runs through the pulley, the same limitation still applies, in that only about half of the total line length can run through the pulley sheave, due to the connectors installed on the line. Also, Parker must use a rope or cord having a generally circular cross section in order to pass through his pulley sheave; a flat strap or chain configuration will not fit through the relatively narrow width of the pulley sheave and the semicircular cross section groove of the pulley, in the Parker leash assembly.

The present leash does not limit the configuration of the pet restraint line, and may make use of relatively wide and flat straps, cord or rope having a round cross section, chain, etc., as desired. Moreover, Parker discloses only a relatively short handle strap, whereas the handling leash of the present dual pet leash may comprise a longer leash line, if so desired. Finally, the present dual pet leash is sufficiently versatile to allow attachment to a tree, post, or other stationary object, if so desired, by means of the longer hand leash line which may be used with the present invention. The Parker leash assembly may only be secured about a stationary object by looping a portion of the line about the object, thus limiting the Parker leash to use with only one animal when such a configuration is used.

U.S. Pat. No. 5,701,848 issued on Dec. 30, 1997 to Masahi Tozawa, titled "Adjustable Animal Leash Provided With Plural Leash Branch Members," describes a dual leash assembly wherein the pet restraint line passes through a swivel loop or ring which is attached to a handler leash line. However, the Tozawa assembly is considerably more restrictive than the present dual pet leash invention, as it includes a pair of keepers along the line. A first keeper is installed adjacent the attachment to the handler line, and prevents the pet restraint portion from running freely through the ring. The second keeper is adjustably placed along the pet restraint line, and holds the doubled portion of the line together. The Tozawa system thus cannot provide the freedom of motion for the pets that the present dual leash provides.

U.S. Pat. No. 5,709,172 issued on Jan. 20, 1998 to Robert Maglich (who is also the present inventor), titled "Leash," describes a single leash strap having a hand hold loop at one end and a snap hook at the opposite end for securing to a pet collar or the like. A second snap hook is secured adjacent the hand loop, with a ring slidably disposed along the length of the strap between both ends. The sliding ring allows the hand hold end of the leash to be wrapped about a stationary object, with the snap hook adjacent the hand hold secured to the sliding ring. The opposite end of the leash is free for attachment to the pet collar or the like. While the leash of the '172 U.S. Patent may be used with the dual pet restraint line of the present invention, it does not per se provide any means of handling two pets simultaneously, as provided by the present dual pet leash invention.

U.S. Pat. No. 5,852,988 issued on Dec. 29, 1998 to Panje L. Gish, titled "Anti-Tangle/Twist Multi-Pet Walking-Leash," describes a multiple leash arrangement in which each leash has a ring at its end closest to the handler, with the ring being connected to a swivel snap hook extending from another ring of another leash. The cascaded leash arrangement allows a number of pets to walk over, under, and around one another without tangling their multiple leashes. However, the Gish assembly comprises a series of fixed length lines and none of the lines can move through a ring or other retainer to vary their lengths, as provided by the present dual pet leash invention.

U.S. Pat. No. 6,029,611 issued on Feb. 29, 2000 to Michael Hershauer, titled "Animal Tethering System," describes a two component system having a relatively short strap with a loop at one end thereof, with a longer strap which passes through the loop of the shorter strap. One end of the longer strap and the end of the shorter strap opposite the loop are secured to cargo tiedowns within a vehicle, while the second end of the longer strap is secured to the collar or harness of an animal after it is passed through the loop of the shorter strap. This arrangement is essentially opposite that of the present invention, with its single handler line and dual pet restraining line extending freely therefrom. The Hershauer leash assembly cannot be used in the manner of the present dual pet leash, as the loop through which the longer strap runs cannot be used as a hand loop for the handler. The opposite end of this length has only a swivel snap extending therefrom, which is unsuitable for use as a handle.

U.S. Pat. No. 6,047,665 issued on Apr. 11, 2000 to Linda J. Deveaux, titled "Multi-Child Modular Tether-Harness Combination," describes an assembly having a lead line with a four way connector at one end thereof. A pair of child restraint tethers may be removably connected to two of the receptacles of the four way connector, with a further lead line connected to the other receptacle, with the arrangement being capable of extension as desired. However, the connectors of the Deveaux assembly cannot provide for free running of any of the attached lines therethrough, as provided by the present dual pet leash invention.

U.S. Pat. No. D-244,869 issued on Jun. 28, 1977 to Paul Manley et al, titled "Animal Leash," illustrates a design in which a pair of leash extensions are braided into a single, relatively short handler length having a handle loop extending therefrom. The arrangement appears to be a unitary assembly, with no means for the two animal attachment lines to move relative to the handler length of the assembly.

U.S. Pat. No. 375,587 issued on Nov. 12, 1996 to Robert L. Maglich, titled "Dog Leash," illustrates a design having a single line with a loop at one end and a free floating ring disposed along the length of the line. This is the parent patent for U.S. Pat. No. 5,709,172 issued to the same patentee and present inventor, which utility patent was discussed in detail further above.

Finally, U.S. Pat. No. D-417,317 issued on Nov. 30, 1999 to Brett Greer, titled "Multiple Dog Leash," illustrates a design which appears to have a first, relatively elongate handle strap with a snap hook at its distal end, and a secondary animal attachment line extending laterally from the first strap. It is not clear from the drawings that the secondary leash line is free to move relative to the first line, and in any case, the arrangement is essentially opposite that of the present invention.

None of the above inventions and patents, taken either singularly or in combination, is seen to describe the instant invention as claimed. Thus a dual pet leash solving the aforementioned problems is desired.

SUMMARY OF THE INVENTION

The present invention is a dual pet leash, for simultaneously walking and controlling two dogs or other household pets or the like. The present dual pet leash includes a pet restraint line having opposite first and second ends, with each end being identically configured with a snap hook or the like for removably securing to the collar or harness of an animal. A leash attachment ring is installed along the restraint line, where it is allowed to float or position itself freely along the length of the line between the two collar attachment ends of the line. A separable leash includes a handle loop and a snap hook or the like for removably attaching the leash to the floating ring of the pet restraint line. The pet restraint line is thus free to travel back and forth between its ends defined by the collar attachment snaps, as the two pets work back and forth. The handler controls the range of the pets generally, according to the length of the leash line attached to the pet restraint line.

A first embodiment includes an elongate leash line with a handle loop at one end thereof, with a second snap hook or the like extending from a point adjacent the handle loop and a free floating ring installed along the length of the leash. This longer leash embodiment allows the leash to be looped around a stationary object (tree, post, etc.), with the snap hook being secured to the ring to secure the leash line temporarily about the object. A second embodiment provides a relatively short leash line, with the pet restraint line attachment extending directly from the handle loop.

Accordingly, it is a principal object of the invention to provide a dual pet leash for walking or exercising two household pets or the like, simultaneously.

It is another object of the invention to provide a dual pet leash having a pet restraint line in which opposed ends are removably and temporarily attachable to the collars or harnesses of two different animals, with the line including a free floating leash attachment ring installed therealong.

It is a further object of the invention to provide dual pet leash having a first leash embodiment comprising a relatively long leash line, with the leash line having a handle loop at one end, a pet restraint line attachment at the opposite end, a freely floating ring disposed along its length, and a ring attachment adjacent the handle loop, for securing the leash line about a stationary object as desired.

Still another object of the invention is to provide a dual pet leash having a second leash embodiment of a relatively short line essentially comprising only a handle loop with a pet restraint line attachment extending therefrom.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
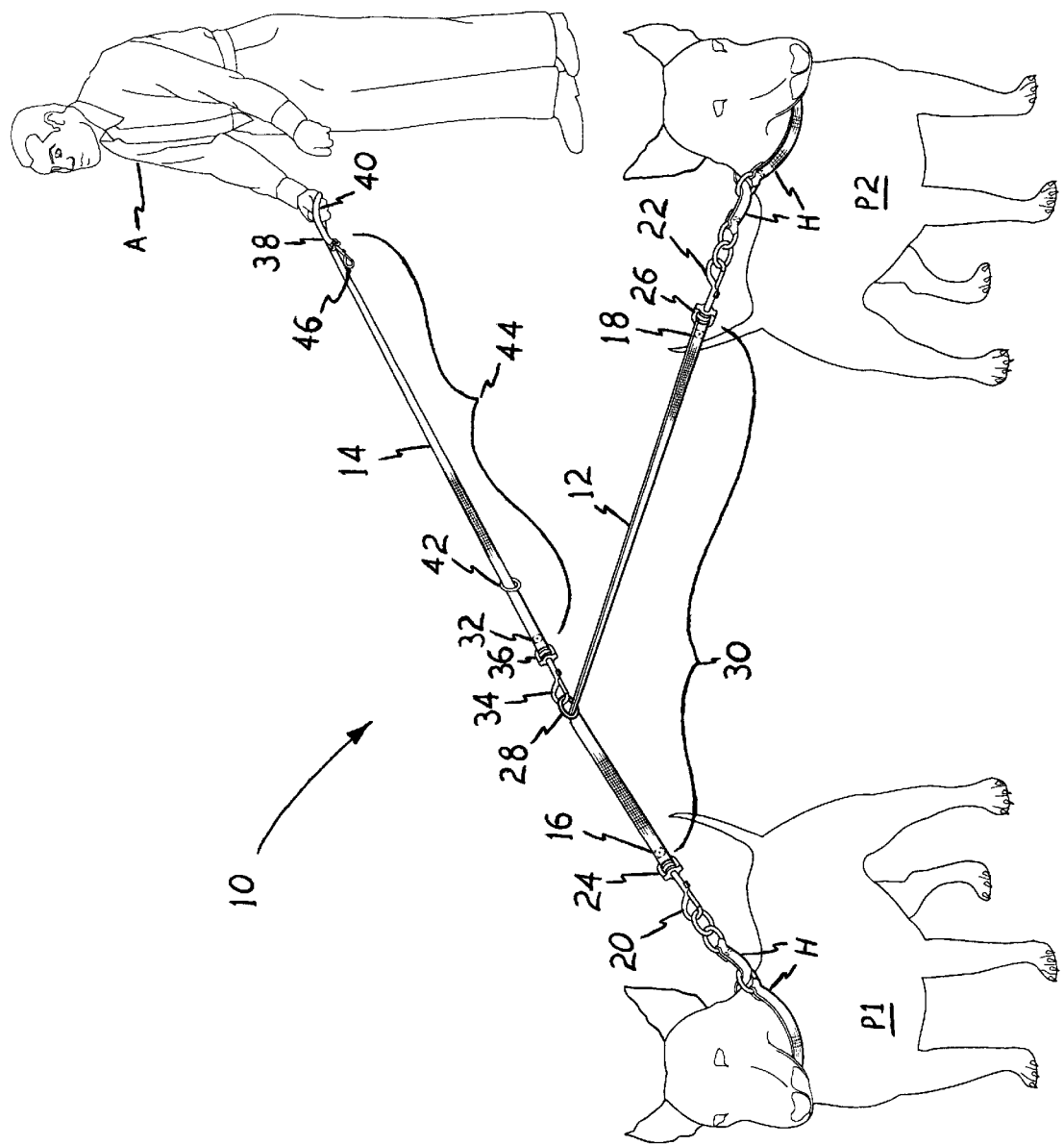
FIG. 1 is an environmental, perspective view of a first embodiment of a dual pet leash according to the present invention, showing its general configuration and use.
Figure 2:
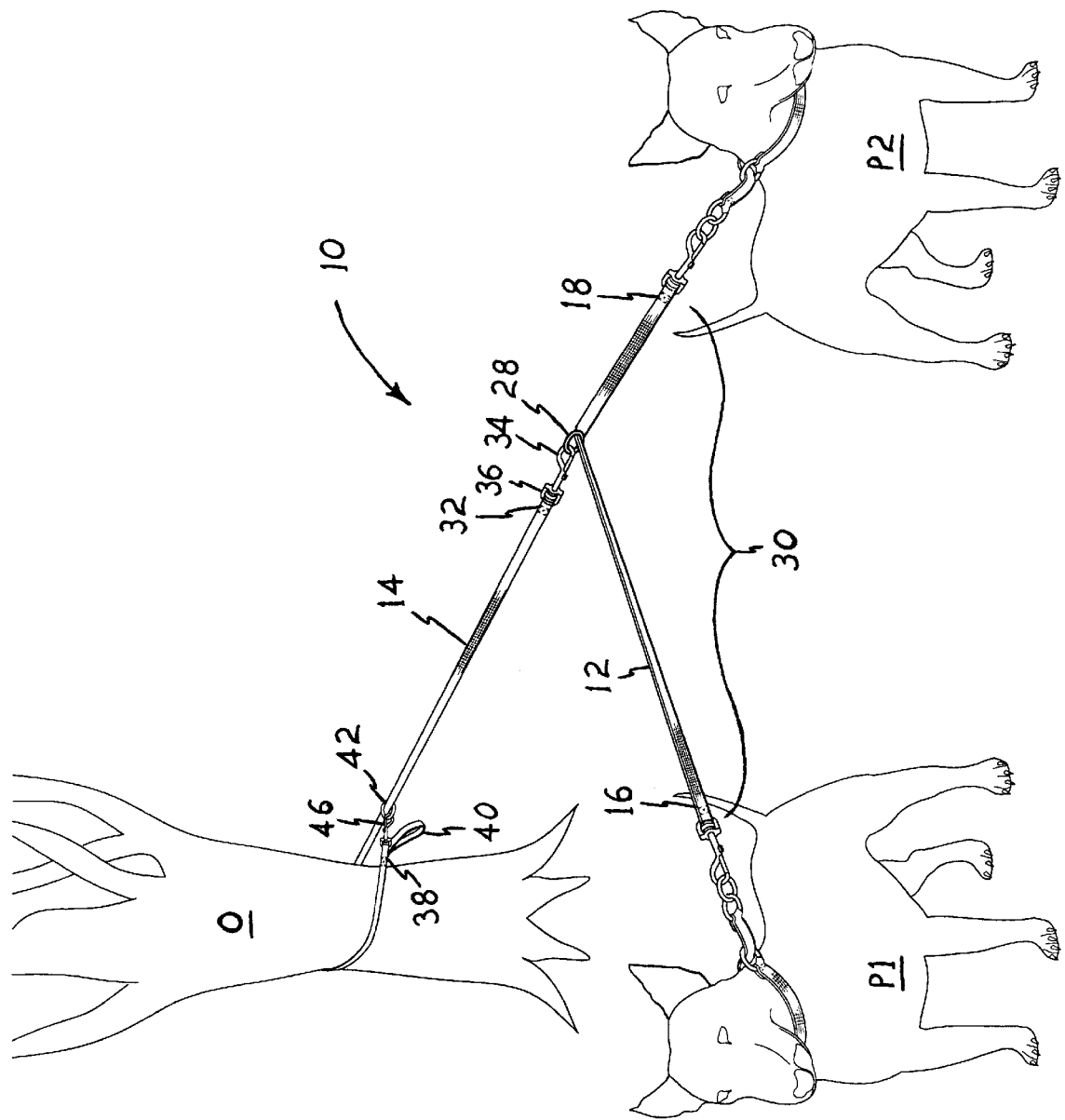
FIG. 2 is an environmental perspective view of an alternate use of the leash embodiment of FIG. 1, showing the device being used as a restraint secured to a stationary object.
Figure 3:
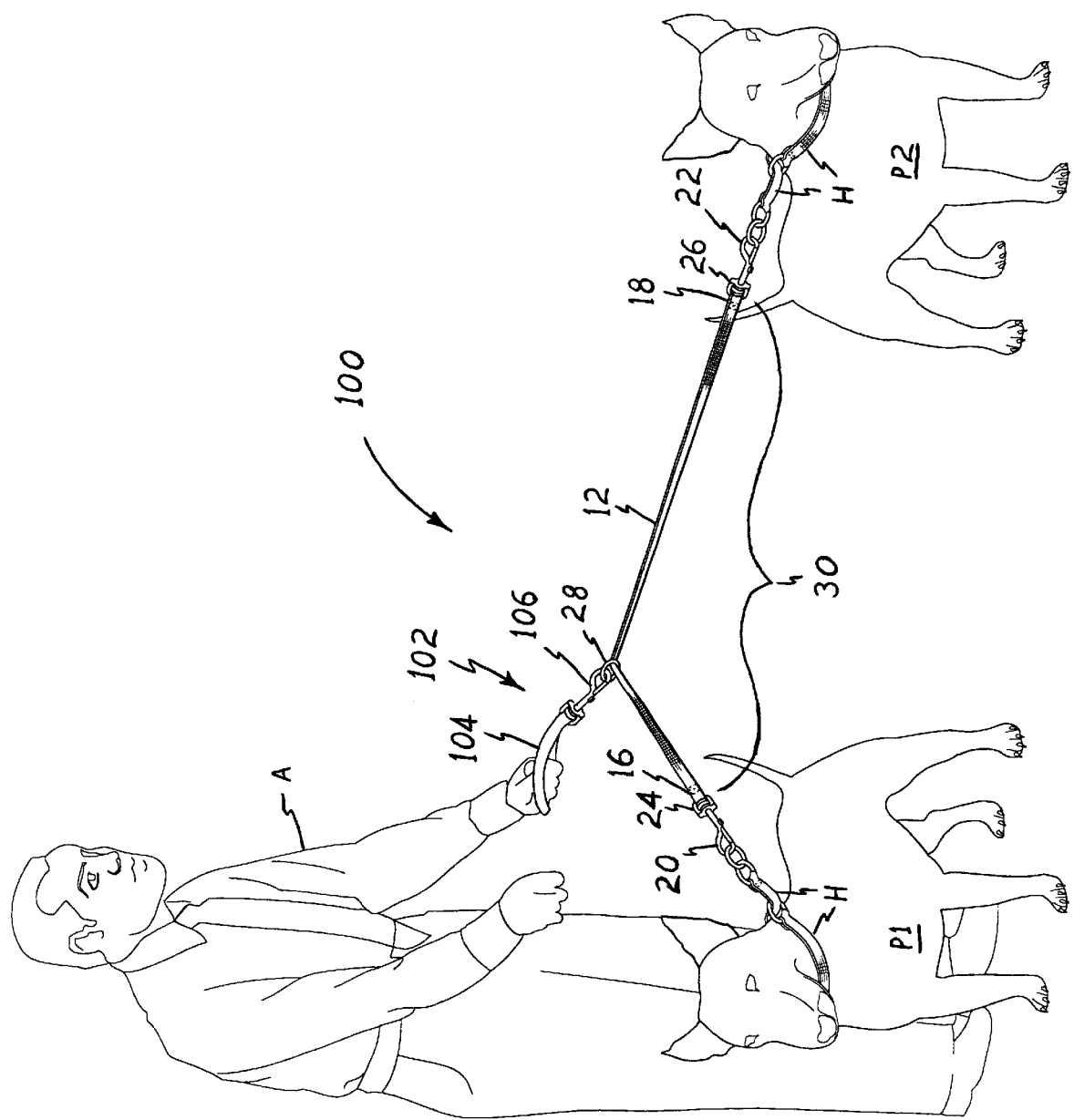
FIG. 3 is an environmental perspective view of a second embodiment of the present dual pet leash having a relatively short leash line.

The present invention comprises different embodiments of a dual pet leash, for walking, exercising, controlling, or restraining two pets simultaneously using a single leash line held by the handler or otherwise secured to a stationary object. FIGS. 1 and 2 illustrate a first embodiment of the present dual pet leash, in which a relatively long leash line is temporarily and removably secured to a pet restraint line which in turn secures two pets together. The longer leash line provides further versatility for securing the line to a stationary object, as shown in FIG. 2. FIG. 3 illustrates a second embodiment of the present dual pet leash, in which the leash line is relatively short.

The dual pet leash 10 of FIGS. 1 and 2 essentially comprises an elongate pet restraint line 12, for removably securing to the harnesses (i.e., collars or other attachments) in turn secured to the first and second pets P1 and P2. A leash line 14 is removably secured to the pet restraint line 12, with the leash line 14 being controlled by a handler A (as in FIG. 1) or alternatively temporarily and removably secured to a stationary object O (as in FIG. 2). The pet restraint line 12 and leash line 14 may be formed of any suitable material, as desired. Flat nylon or other synthetic fabric web or strap material has been found to work well in testing of the device, and provides further versatility in that it is readily dyed to provide virtually any color desired. Other flexible materials (natural woven fabrics, leather, or even metal chain) may also be used as desired, as the cross sectional shape of the material used is not critical to the function of the invention.

The pet restraint line 12 has a first end 16 and an opposite second end 18, respectively terminating in a first and a second pet harness attachment 20 and 22. The attachments 20 and 22 preferably comprise snap fasteners, i.e., hooks having spring loaded closures which hold the loop defined by the hook in a normally closed configuration to preclude release of an article contained by the hook. However, other types of fasteners (carabiners, etc.) may be provided as desired. The attachments 22 in turn removably secure to the pet harnesses H (collar, harness, etc.). Preferably, each attachment 20 and 22 has a swivel, respectively 24 and 26, at its attachment end to its respective pet restraint line end 16 and 18.

The pet restraint line 12 includes a leash attachment ring 28 installed thereon, and captured between the first and second ends 16 and 18 of the pet restraint line 12. The ring 28 is preferably formed of a sturdy, durable material having a low coefficient of surface friction, such as steel. The ring 28 has an inner diameter which is at least slightly larger than the width of the strap or other material from which the pet restraint line 12 is formed, thus allowing the ring 28 to slide or float easily along the entire length 30 of the pet restraint line 12 between the opposite first and second ends 16 and 18. The ring 28 is retained on the pet restraint line 12 only by the two attachments 20 and 22 at the two respective extreme ends 16 and 18 of the pet restraint line 12, and is thus freely positionable to any point or location therealong, without restriction or limit.

The elongate leash line 14 has a first end 32 with a pet restraint attachment 34 (snap hook with swivel attachment 36, or other suitable attachment) extending therefrom, with an opposite second end 38 having a handle loop 40 formed therein. FIG. 1 provides an illustration of the pet restraint line 12 and leash line 14 assembly, when being used to walk or exercise two pets P1 and P2. The pet restraint attachment 34 is removably attached to the ring 28 along the pet restraint line 12, with the attendant A holding the hand loop 40 at the opposite end 38 of the leash line 14. The two pets P1 and P2 are free to work back and forth to the limits of the length 30 of the pet restraint line 12, with the line 12 passing back and forth through the ring 28 installed thereon.

The present dual pet leash 10 may provide further versatility by adding a freely floating leash line securing ring 42 thereto, with the ring 42 being free to travel along essentially the entire length 44 of the leash line 14, being limited only by the pet: restraint attachment 34 at the first end 32 of the leash line 14 and by the hand loop 40 at the opposite second end 38 of the leash line 14. While this structure and operation are similar to that described above for the pet restraint line 12 and its pet restraint line ring 28, the ring 42 of the leash line 14 serves a different purpose, as illustrated in FIG. 2 of the drawings.

It will be noted in FIGS. 1 and 2 that a leash line securing attachment 46 (another swivel snap hook, or other suitable removable attachment) is affixed to and extends from the second end 38 of the leash line 14, adjacent the handle loop 40. This attachment 46, along with the leash line securing ring 42, permit the leash line 14 to be secured about a stationary object O as illustrated in FIG. 2 with the leash line 14 being secured about a tree. The pet handler or attendant A need only extend the second end 38 of the leash line 14 about the object O, and clip or otherwise attach the snap hook or other fastener 46 to the leash line securing ring 42. While the addition of the leash line securing ring 42 and leash line attachment 46 are not essential to the operation of the present dual pet leash invention, and particularly the pet restraint portion 12, the provision of the leash line securing ring 42 and leash line attachment 46 serve to provide additional versatility for the present dual pet leash.

FIG. 3 of the drawings illustrates a second embodiment, comprising a dual pet leash assembly 100. In FIG. 3, a relatively short leash line 102 has been substituted for the relatively long leash line 14 of FIGS. 1 and 2. The pet restraint line assembly, comprising the pet restraint line 14, its two ends 16 and 18 with their respective attachments 20 and 22 and swivels 24 and 26, and pet restraint ring 28, are identical to the pet restraint line assemblies illustrated in FIGS. 1 and 2 of the drawings. However, the short leash line 102 comprises only a handle loop 104 with a pet restraint attachment 106 (swivel snap hook, etc.) extending directly therefrom, with no intervening length of leash line. The pet restraint line 14 is still free to run back and forth through its pet restraint ring 28, with the handler or attendant A holding the handle loop 104 from which the pet restraint attachment 106 extends directly to attach to the pet restraint ring 28.

While this embodiment does not provide the versatility of the longer leash line 14 illustrated in FIGS. 1 and 2, it serves to limit the total travel available to the pets P1 and P2, and thus may be desirable in certain circumstances where limited motion or travel of the pets may be important (urban or suburban sidewalks, crowded parks, etc.). The handler or attendant A merely holds the hand loop 104 at a comfortable height, with the length of the pet restraint line 14 passing upwardly as required to pass through the pet restraint ring 28 secured to the pet restraint attachment 106 extending directly from the handle loop 104 of the short leash assembly 102.

In conclusion, the present dual pet leash provides considerable improvement in versatility, ease of assembly and operation, and economy of purchase over other devices of the prior art adapted for walking, exercising, or restraining two pets. The present dual pet leash provides full travel along the entire length of the pet restraint portion of the assembly, which function was heretofore not available in dual leashes of the prior art. Moreover, the use of the longer leash attachment of FIGS. 1 and 2, with its attachment ring and attachment snap or the like, provide even greater versatility by allowing the assembly to be temporarily secured about a stationary object (tree, post, pole, etc.) as desired. When the additional range provided by the longer leash portion is not desired or required, the shorter leash assembly illustrated in FIG. 3 may be used instead.

These various components may be provided as a kit, with the pet owner or caretaker free to assemble the various components with one another as desired, or they may be provided as separate components, with the purchaser selecting only those components desired or required for his or her specific circumstances. Either way, the present dual pet leash provides a much needed improvement in the art of pet leashes, which will prove to be much appreciated by persons who own or care for two pets.

It is to be understood that the present invention is not limited to the embodiments described above, but encompasses any and all embodiments within the scope of the following claims.

We claim:

1. A dual pet leash for simultaneously restraining a first and a second pet by attaching to a respective harness thereof, comprising:

an elongate pet restraint line having a first end, a second end opposite said first end, and a length defined by said first end and said second end;

a first and a second pet harness attachments extending respectively from said first and said second end thereof, for removably attaching to the respective harnesses of the first and second pet;

a freely floating leash attachment ring disposed along said length of said pet restraint line and captured thereon by said first and said second pet harness attachment, with movement of said leash attachment ring along said pet restraint line being limited only by said first and said second pet harness attachment of said first and said second end of said pet restraint line;

a leash line having a pet restraint attachment extending therefrom and removably attached to said leash attachment ring of said pet restraint line, and having a handle loop;

said leash line comprising an elongate line having a first end, a second end opposite said first end, and a length defined by said first end and said second end;

said pet restraint attachment extending from said first end of said leash line;

said handle loop extending from said second end of said leash line;

a leash line securing attachment extending from said leash line, adjacent said handle loop thereof; and a freely floating leash line securing ring disposed along said length of said leash line and captured thereon by said pet restraint attachment of said first end of said leash line and said handle loop of said second end of said leash line, with movement of said leash line securing ring along said leash line being limited only by said pet restraint attachment of said first end of said leash line and said handle loop of said second end of said leash line; whereby said first end of said leash line is extended about a stationary object with said leash line securing attachment being removably secured to said leash line securing ring for temporarily and removably securing said leash line to the stationary object as desired.

2. The dual pet leash according to claim 1, wherein said first and said second pet harness attachment of said pet restraint line and said pet restraint attachment of said leash line, comprise snap hooks.

3. The dual pet leash according to claim 2, wherein said snap hooks include a swivel attachment mechanism.

4. The dual pet leash according to claim 1, wherein said pet restraint line is formed of material selected from the group consisting of a flat web strap of synthetic fabric material, a flat strap of leather material, and chain.

5. The dual pet leash according to claim 1, wherein said leash line is formed of material selected from the group consisting of a flat web strap of synthetic fabric material, a flat strap of leather material, and chain.

* * * * *